United States Patent

Bugdaci et al.

[11] Patent Number: 5,816,607
[45] Date of Patent: Oct. 6, 1998

[54] AIRBAG SYSTEM

[75] Inventors: Arif Bugdaci, Alfter; Michael Brodam, Sankt Augustin, both of Germany

[73] Assignee: VAW Aluminium AG, Bonn, Germany

[21] Appl. No.: 717,958

[22] Filed: Sep. 23, 1996

[30] Foreign Application Priority Data

Sep. 23, 1995 [DE] Germany .................. 195 35 430.3

[51] Int. Cl.$^6$ .................................................. B60R 21/26
[52] U.S. Cl. ........................................ 280/728.2; 280/732
[58] Field of Search ............................... 280/728.2, 732

[56] References Cited

U.S. PATENT DOCUMENTS

| 5,378,009 | 1/1995 | Lauritzen et al. | 280/741 |
| 5,480,182 | 1/1996 | Lauritzen et al. | 280/728.2 |
| 5,498,024 | 3/1996 | Caruso, Jr. et al. | 280/728.2 |
| 5,511,819 | 4/1996 | Spilker et al. | 280/728.2 |
| 5,582,423 | 12/1996 | Rion et al. | 280/728.2 |

FOREIGN PATENT DOCUMENTS

| 0 292 229 A1 | 11/1988 | European Pat. Off. |
| 0 620 139 A1 | 10/1994 | European Pat. Off. |

*Primary Examiner*—Kenneth R. Rice
*Attorney, Agent, or Firm*—Darby & Darby

[57] ABSTRACT

An airbag system includes a cylindrical housing which defines a chamber for a gas generator. The ends of the housing are closed by plugs which are friction welded to the housing. One of the plugs carries an ignition device for a gas generator in the housing. Two arms extend from the housing, and the ends of the arms remote from the housing are provided with lugs for fixing an airbag cover to the housing. The arms, or the arms and the housing, define at least one groove for anchoring an airbag underneath the airbag cover and over part of the housing. This part of the housing is provided with a number of vent apertures which permit gas to flow from the housing into the airbag.

19 Claims, 4 Drawing Sheets

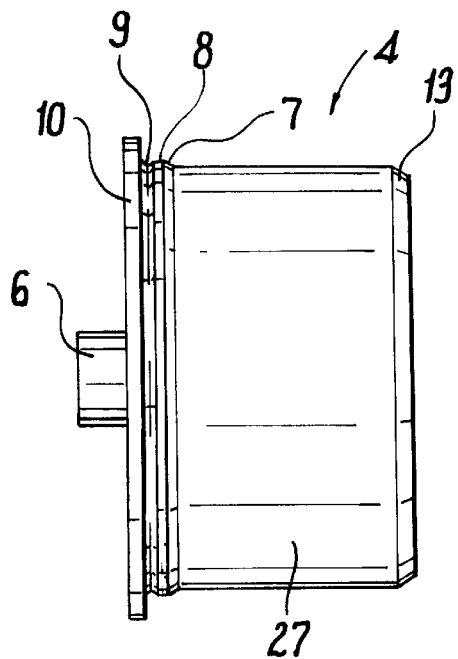
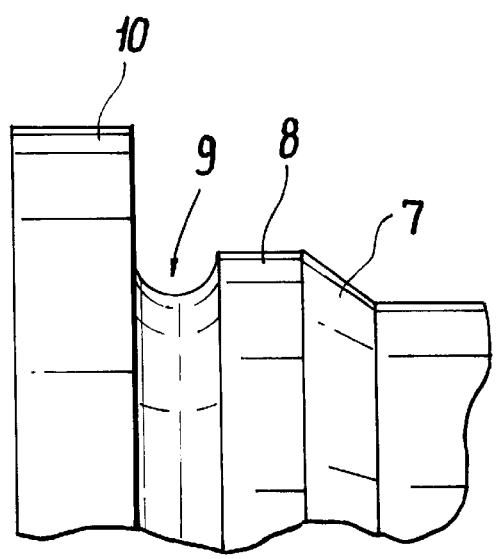
Fig. 2
Fig. 2a
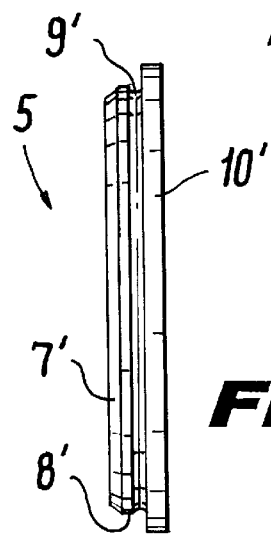
Fig. 3
Fig. 4
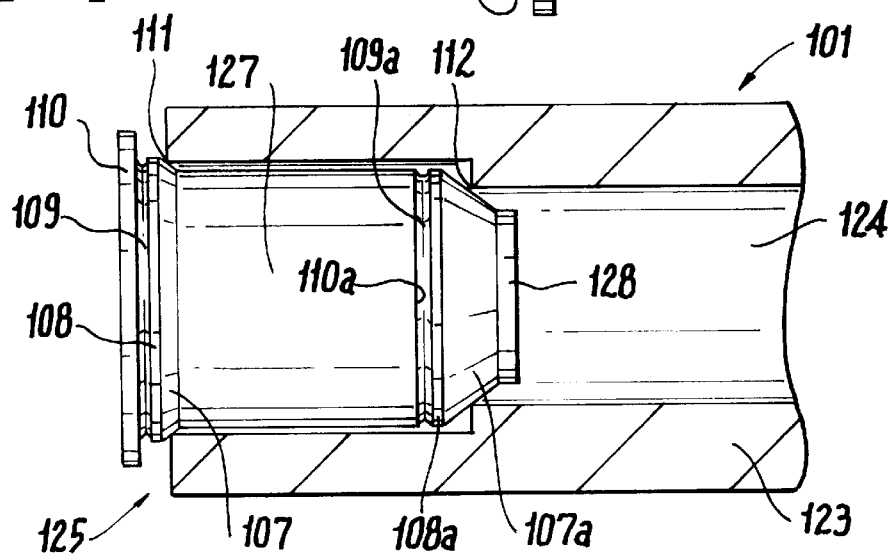

AIRBAG SYSTEM

BACKGROUND OF THE INVENTION

The invention relates to an airbag system.

The airbag systems used in passenger cars consist of several components, namely, an airbag, a gas generator and an activating or ignition device. Such airbag systems must be lightweight, powerful, reliable, economical and compact.

New applications for airbag systems have been under consideration for some time. Thus, it has been proposed to use airbag systems for side impacts, commercial vehicles, bicycles and improved head protection. These new applications place an increased emphasis on low weight and compactness as well as low cost and reliability.

The gas generators employed in airbag systems fall into several categories depending upon the substances used in the gas generators. One type of gas generator, based on solids, brings nitrogen compounds into contact with oxygen carriers. Catalysts and cooling agents may also be required. Liquid-based gas generators such as, for example, those containing hydrazine/hydrazine nitrate mixtures and hydroxyl ammonium nitrate, represent another category of gas generators. Further, there is the hybrid gas generator in which compressed gas flows from a container into an airbag upon puncturing of a membrane. A pyrotechnic ignition device operating in two stages punctures the membrane and heats the working gas. Heating of the gas compensates for the cooling which occurs as the gas expands. Another type of gas generator produces gaseous products containing carbon monoxide from either liquid or solid substances. The carbon monoxide is a problem here since it is present in substantial concentrations.

SUMMARY OF THE INVENTION

It is an object of the invention to provide an airbag system which can fit in small areas and be made compatible with most, if not all, types of gas generators.

Another object of the invention is to provide an airbag system which can be installed in small areas and can offer a high degree of reliability.

An additional object of the invention is to provide an airbag system which can be incorporated in small areas and can be designed to be lightweight.

A further object of the invention is to provide an airbag system which can fit in small areas and be made economically.

The preceding objects, as well as others which will become apparent as the description proceeds, are achieved by the invention.

One aspect of the invention resides in an airbag system. The system comprises a housing for a gas generator, and the housing defines a chamber for the gas generator and has a peripheral wall. The system further comprises means for mounting an airbag opposite a section of the peripheral wall and this section is provided with at least one vent aperture.

The peripheral wall may be fast with at least one arm situated outward of the wall, and the arm can at least in part define a mounting element constituting part of the mounting means. A second arm fast with the peripheral wall can also be provided outward of the wall, and the second arm can likewise at least in part define a mounting element constituting part of the mounting means.

The housing may include a tubular element which is preferably cylindrical.

The housing can have an opening and the airbag system then comprises a closure for the opening. A second opening may be present in the housing and, in such an event, a closure is provided for the second opening as well.

It has been found that a separate housing for the gas generator can be eliminated when the components of an airbag system are matched to one another in accordance with the invention. The wall thickness of the housing is advantageously selected in dependence upon the type of gas generator to be used.

Additional features and advantages of the invention will be forthcoming from the following detailed description of preferred embodiments when read in conjunction with the accompanying drawings.

BRIEF DESCRIPTION OF THE DRAWINGS P

FIG. 2 is a side view of a closure constituting part of the system of FIG. 1.

FIG. 2a is an enlarged view of the area I in FIG. 2.

FIG. 3 is a side view of a second closure constituting part of the system of FIG. 1.

FIG. 4 is a fragmentary, longitudinal partly sectional view of an airbag system with another embodiment of a closure.

DESCRIPTION OF THE PREFERRED EMBODIMENTS

Figure 1:
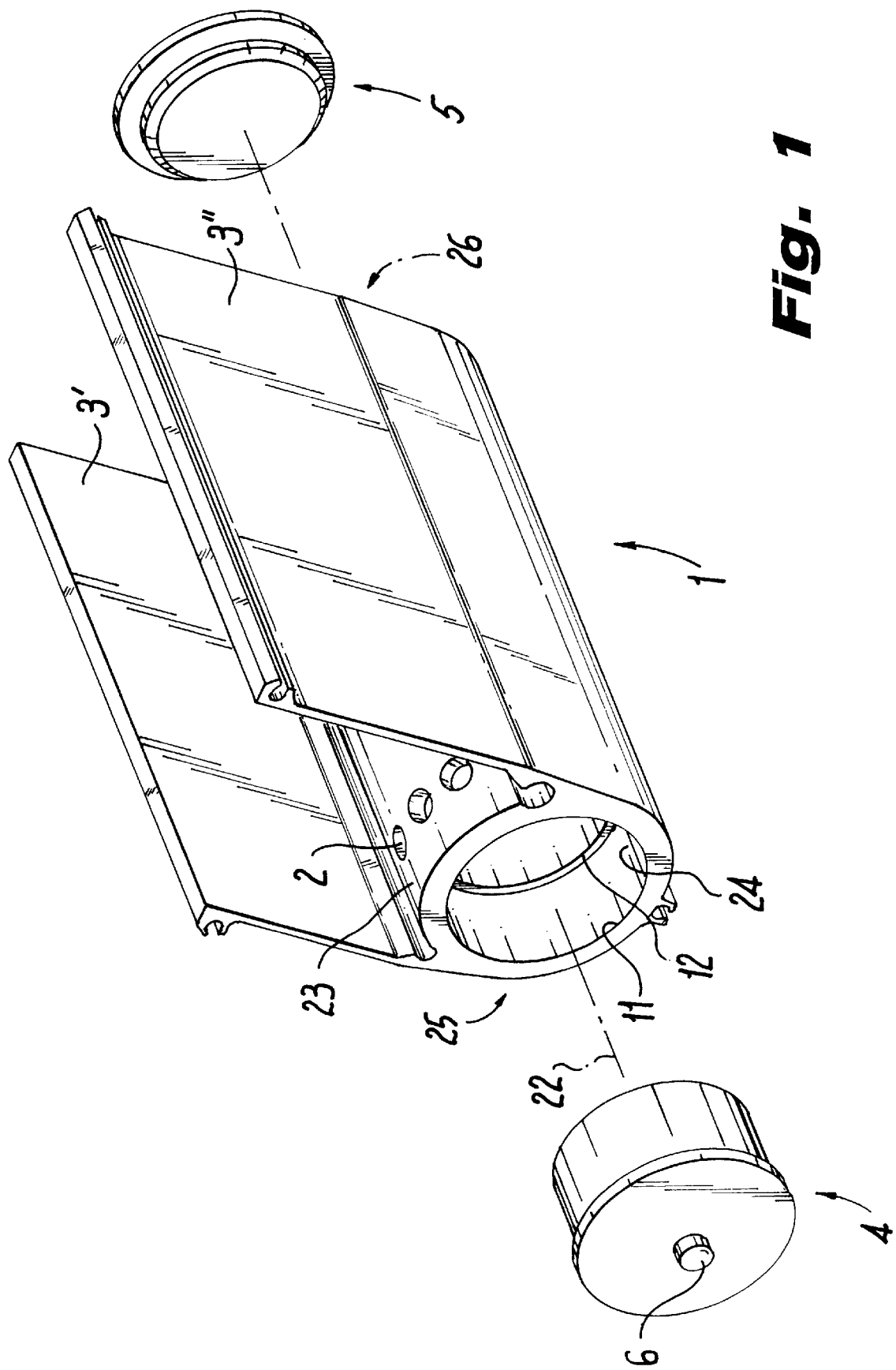
FIG. 1 is a perspective view of an airbag system according to the invention.
Figure 5:
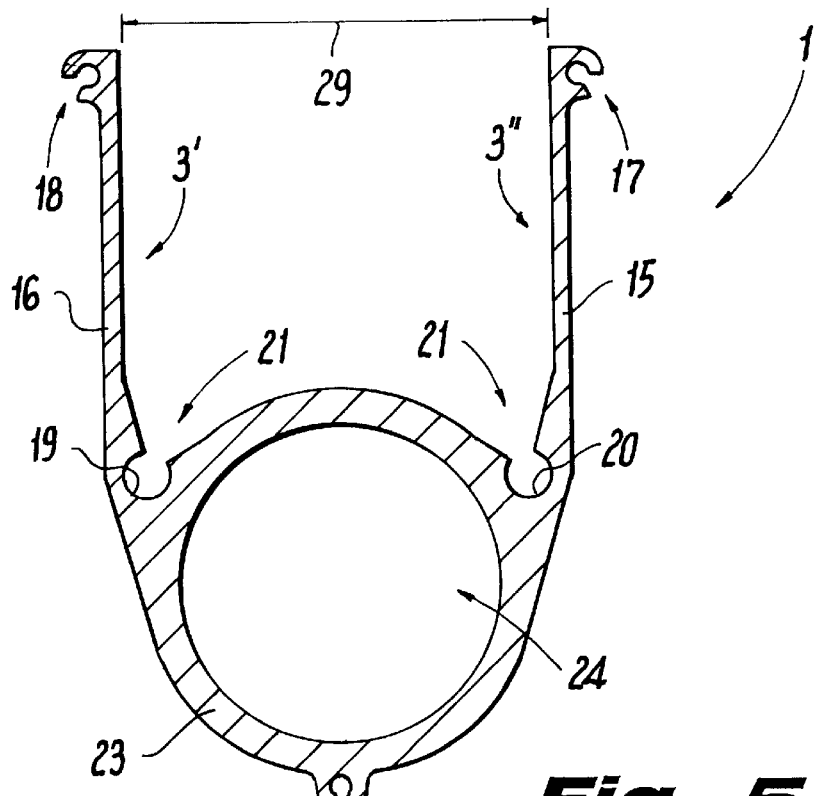
FIG. 5 is a transverse sectional view of a housing forming part of the system of FIG. 1.

FIGS. 1 and 5 show an airbag system in accordance with the invention. The system includes a housing 1 in the form of a tubular element having a generally cylindrical configuration. The housing 1 has an approximately cylindrical peripheral wall 23 which defines a chamber 24 of circular cross section designed to receive a non-illustrated gas generator. The gas generator may be conventional.

The housing 1 is elongated and has a longitudinal axis 22. The chamber 24 runs the length of the housing 1 from one axial end 25 of the housing 1 to the other axial end 26 thereof. Each of the axial ends 25, 26 is provided with an opening, and the peripheral wall 23 defines a sharp edge at both openings as indicated at 11 for the opening at the axial end 25.

The chamber 24 has a predetermined diameter or cross-sectional area at the opening of the axial end 25. Some distance inward of this opening, the diameter or cross-sectional area of the chamber 24 decreases abruptly to form a shoulder or step 12 having a sharp edge. The diameter or cross-sectional area of the chamber 24 may remain constant between the shoulder 12 and the axial end 26 although it is possible for the diameter or cross-sectional area to increase abruptly near the end 26 so as to form a second shoulder.

Referring to FIGS. 2 and 2a in conjunction with FIG. 1, a closure or plug 4 is provided for the axial end 25. The plug 4 comprises an abutment or stop having an abutment surface 10 which is located adjacent a groove 9 in the plug 4. The groove 9 is preferably arcuate and here has a semicircular cross section. The groove 9 is followed, in a direction away from the abutment surface 10, by an annular or cylindrical rim or collar 8 having a diameter or cross-sectional area somewhat greater than that of the chamber 24 at the axial end 25. On the side of the rim 8 remote from the abutment surface 10 is a tapering section or portion 7 of the plug 4. The tapering section 7 which can, for instance, be frustoconical, narrows in a direction away from the abutment surface 10. The smaller end of the tapering section 7 is fast with a cylindrical section or portion 27 of the plug 4. At the end of the cylindrical section 27 remote from the tapering section 7 is a second tapering section or portion 13 of the plug 4. Similarly to the tapering section 7, the tapering section 13 narrows in a direction away from the abutment surface 10 and may, for example, be frustoconical.

The plug 4 is equipped with an activating or ignition device 6 for the gas generator.

Considering FIG. 3 together with FIG. 1, a second closure or plug 5 is provided for the axial end 26. In FIG. 3, those sections or portions of the plug 5 corresponding to sections or portions of the plug 4 are identified by the same reference numerals but with primes.

The plug 5 differs from the plug 4 in that the cylindrical section 27 and tapering section 13 of the plug 4 are missing from the plug 5. Furthermore, the plug 5 is not equipped with an activating or ignition device like the device 6.

In the plug 4, the diameter or cross-sectional area of the annular rim 8 is somewhat greater than that of the chamber 24 at the axial end 25. The diameter or cross-sectional area of the annular rim 8' of the plug 5, on the other hand, is somewhat greater than that of the chamber 24 at the axial end 26.

When the plug 4 is inserted in the axial end 25, the tapering section 7 comes to bear against the sharp edge 11 at the opening of the axial end 25 while the tapering section 13 comes to bear against the sharp edge of the shoulder 12. This allows a friction weld to be formed at the axial end 25 as well as at the shoulder 12. During friction welding, melting occurs in the region of the tapering section 7 and the region of the tapering section 13. Melting also takes place in the region of the annular rim 8 because the diameter or cross-sectional area of the annular rim 8 exceeds the diameter or cross-sectional area of the chamber 24 at the axial end 25. At least part of the molten material generated during friction welding runs into the groove 9, and the groove 9 cooperates with the abutment surface 10 to confine the molten material formed in the vicinity of the annular rim 8.

In a similar manner, the tapering section 7' of the plug 5 comes into contact with the sharp edge at the opening of the axial end 26 upon insertion of the plug 5 into the axial end 26. A friction weld can thus be produced at the axial end 26 also.

The friction welds establish connections between the plugs 4, 5 and the peripheral wall 23. Since different types of gas generators generate forces of different magnitude, the strength of the connections may be different for different types of gas generators.

FIG. 4 shows a closure or plug 104 which can be employed in lieu of the plug 4. In FIG. 4, the same reference numerals as in FIGS. 1, 2 and 2a, plus one-hundred, are used to identify corresponding elements.

The plug 104 differs from the plug 4 in that the tapering section 13 of the plug 4 is eliminated in the plug 104. The end of the cylindrical section 127 remote from the tapering section 107 defines an abutment surface 110a which adjoins a groove 109a. The groove 109a can resemble the groove 9.

The groove 109a is followed, in a direction away from the abutment surface 110a, by an annular or cylindrical rim or collar 108a. The annular rim 108a has a diameter or cross-sectional area somewhat greater than the diameter or cross-sectional area of the narrower portion of the chamber 124. On the side of the annular rim 108a remote from the abutment surface 110a is a tapering section or portion 107a of the plug 104. The tapering section 107a narrows in a direction away from the abutment surface 110a and may, for instance, be frustoconical. The narrow end of the tapering section 107a is fast with an annular or cylindrical section or portion 128 of the plug 104.

When the plug 104 is inserted in the axial end 125 of the housing 101, the tapering section 107 comes to bear against the sharp edge 111 of the opening in the axial end 125 whereas the tapering section 107a comes to bear against the sharp edge defined by the shoulder 112. This allows a friction weld to be formed at the axial end 125 as well as at the shoulder 112. The grooves 109 and 109a of the plug 104 serve the same function as the groove 9 of the plug 4 and constitute receptacles for molten material generated during friction welding. The groove 109 cooperates with the abutment surface 110 to confine the molten material produced in the vicinity of the annular rim 108 while the groove 109a cooperates with the abutment surface 110a to confine the molten material produced in the vicinity of the annular rim 108a.

Considering FIG. 5 in conjunction with FIG. 1, two arms 3' and 3" project outward from the peripheral wall 23 of the housing 1. The arms 3',3" are integral or rigid with the peripheral wall 23 and are parallel or approximately parallel to each other. The arms 3',3", which run the length of the housing 1, confront one another and define a gap 29. The peripheral wall 23 has a boundary section 21 adjacent to the gap 29.

The arm 3' includes a web or plate-like member 16 which extends outward from the peripheral wall 23. The end of the web 16 remote from the peripheral wall 23 is provided with an arresting element 18 in the form of a lug.

The arm 3" also comprises a web or plate-like member 15 which extends outward from the peripheral wall 23, and the web 15 has the same width as the web 16. Like the web 16, the end of the web 15 remote from the peripheral wall 11 is formed with an arresting element 17 in the form of a lug.

The lugs 17, 18 are provided with passages and serve to fix a non-illustrated airbag cover on the arms 3',3".

The end of the arm 16 adjacent the peripheral wall 23 cooperates with the peripheral wall 23 to define a groove or mounting element 19. Similarly, the end of the arm 15 adjacent the peripheral wall 23 cooperates with the peripheral wall 23 to define a groove or mounting element 20. The grooves 19, 20 function to anchor a non-illustrated airbag to the housing 1 over the boundary section 21 of the peripheral wall 23.

As shown in FIG. 1, the boundary section 21 of the peripheral wall 23 is provided with vent apertures 2. The vent apertures 2 allow gases generated by a gas generator in the housing 1 to flow from the chamber 24 into an airbag mounted over the boundary section 21.

The plugs 4, 5 form gastight seals with the peripheral wall 23 once the plugs 4, 5 have been friction welded thereto. The housing 1 is then gastight except for the vent apertures 2.

If the housing 1 is to accommodate a hybrid gas generator, the thickness of the peripheral wall 23 should be relatively great. Smaller wall thicknesses can be used for other types of gas generators.

The housing 1 with the arms 3',3" is designed for narrow but deep spaces.

Figure 6:
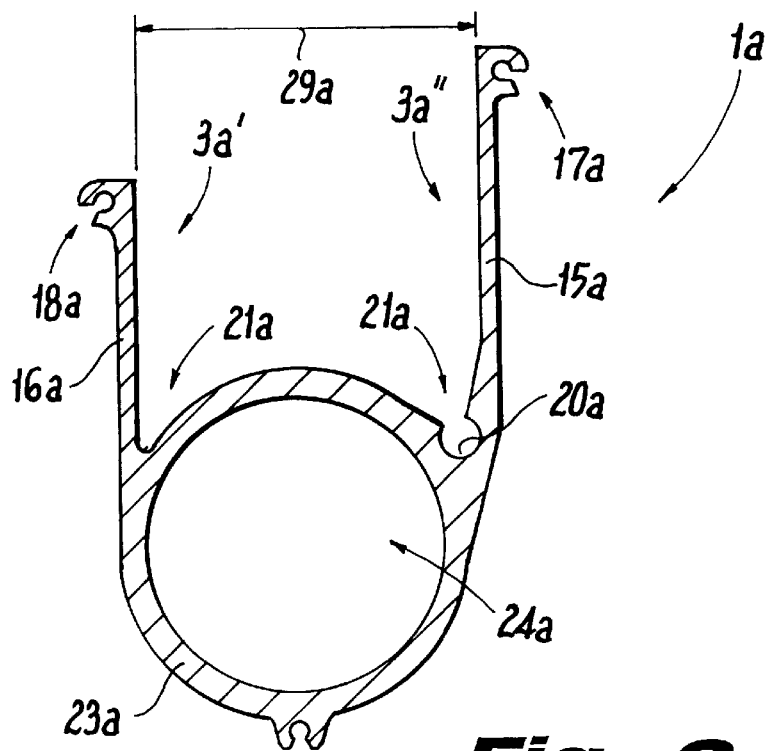
FIG. 6 is similar to FIG. 5 but illustrates another embodiment of the housing.

Another embodiment of housing with arms is illustrated in FIG. 6 where the same reference numerals as in FIG. 5, but with the suffix "a", are used for similar elements.

In FIG. 6, the web 16a is shorter than the web 15a. Moreover, the web 16a and the peripheral wall 23a do not define a groove like the groove 19 of FIG. 5.

Figure 7:
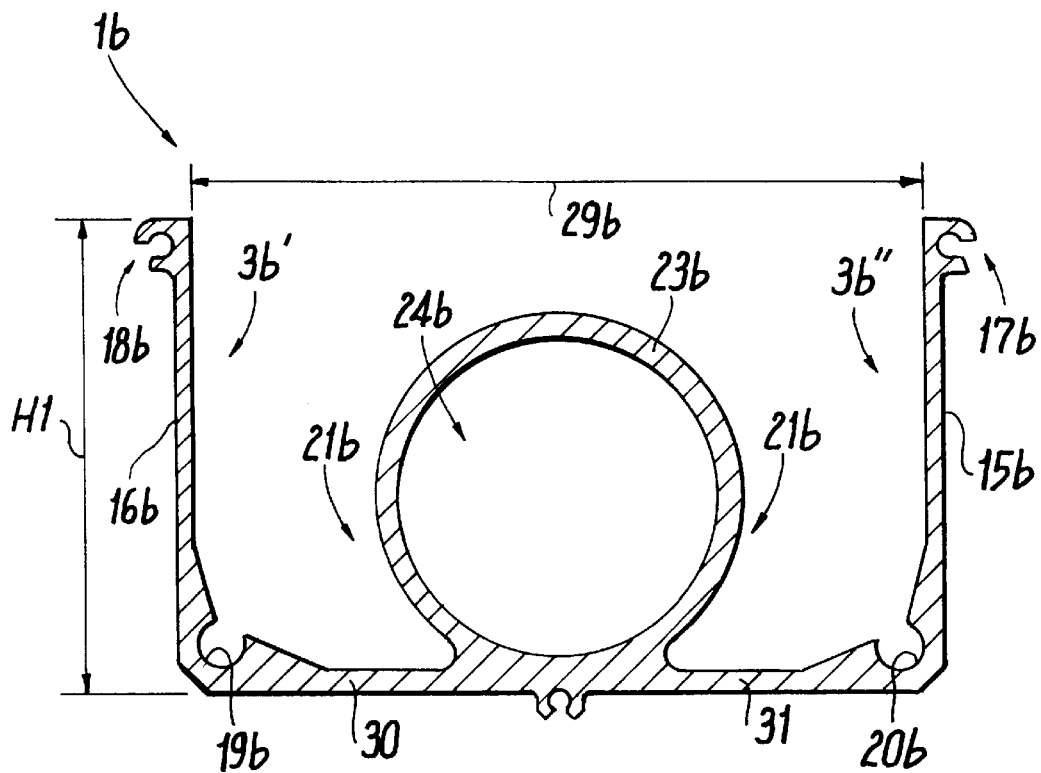
FIG. 7 is similar to FIGS. 5 and 6 but shows an additional embodiment of the housing.

A further embodiment of housing with arms is shown in FIG. 7 where the same reference numerals as in FIG. 5, but with the suffix "b", are used to denote corresponding elements.

The arms 3'b and 3"b are L-shaped and, in addition to the webs 15b, 16b, respectively include a web or plate-like member 30 and a web or plate-like member 31. For ease of description, and not by way of limitation, the webs 15b, 16b will be referred to as the vertical webs whereas the webs 30, 31 will be referred to as the horizontal webs.

The horizontal web 30 extends from the peripheral wall 23b to one side of the housing 1b while the horizontal web 31 extends from the peripheral wall 28b to the opposite side of the housing 1b. The horizontal webs 30, 31, which are essentially coplanar, are integral or rigid with the peripheral wall 23b. The vertical web 16b is integral or rigid with the end of the horizontal web 30 remote from the peripheral wall 23b and is perpendicular or approximately perpendicular to the horizontal web 30. Similarly, the vertical web 15b is integral or rigid with the end of the horizontal web 31 remote from the peripheral wall 23b and is normal or approximately normal to the horizontal web 31. The vertical web 16b and the horizontal web 30 cooperate to define the groove 19b at the juncture of the webs 16b, 30. Likewise, the vertical web 15b and the horizontal web 31 cooperate to define the groove 20b at the juncture of the webs 15b, 31.

The housing 1b with the arms 3'b, 3"b is designed for relatively wide spaces having relatively small depths. The housing 1b with the arms 3'b, 3"b has a height H1 which is about 15% less than the height of comparable conventional structures.

Figure 8:
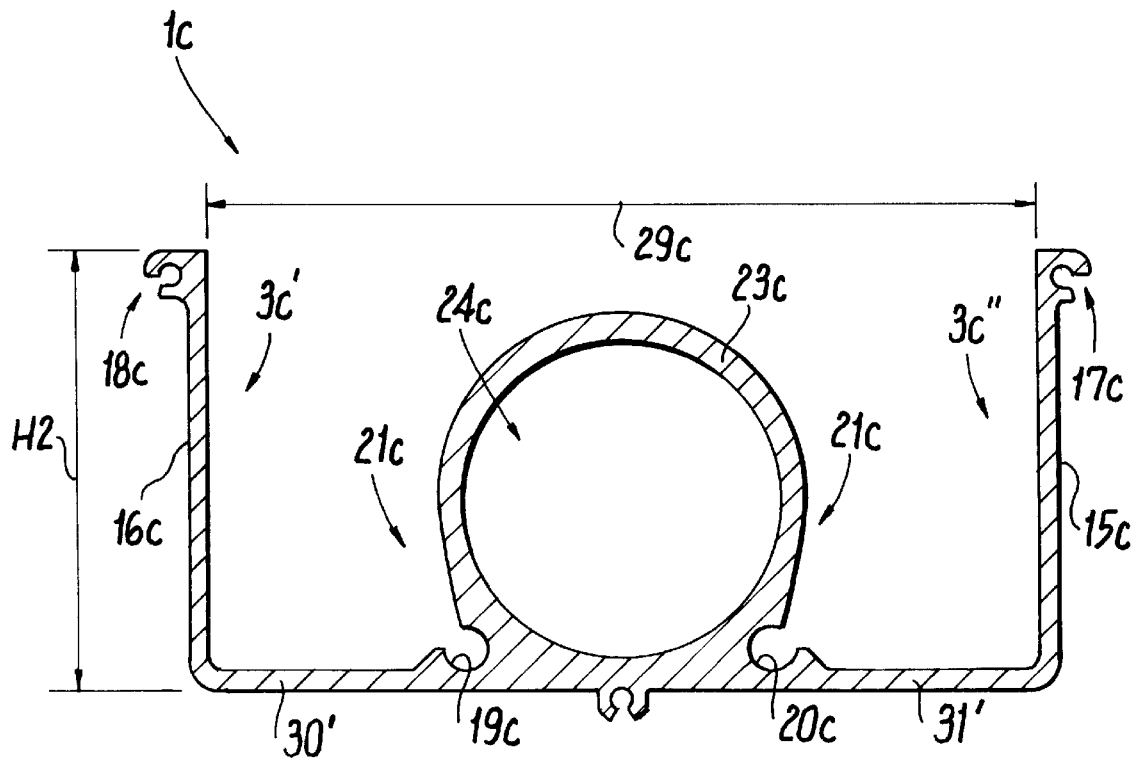
FIG. 8 is similar to FIGS. 5–7 but illustrates a further embodiment of the housing.

An additional embodiment of housing with arms is illustrated in FIG. 8 where, with the exception of the horizontal webs, the same reference numerals as in FIG. 7, but with the suffix "c", are used to denote corresponding elements. The horizontal webs in FIG. 8 are identified by 30' and 31', respectively.

In FIG. 8, the groove 19c is defined by the peripheral wall 23c and the web 30' while the groove 20c is defined by the peripheral wall 23c and the web 31'.

The housing 1c with the arms 3'c,3"c is again intended for relatively wide spaces with relatively small depths. The housing 1c with the arms 3'c, 3"c has a height H2 which is approximately 20% less than the height of comparable conventional structures.

The invention makes it possible to achieve cost reductions of 10% to 25% because fewer components are required. Moreover, depending upon the type of gas generator employed, weight savings of 10% to 20% can be realized for the same system size, i.e., for the same airbag volume and the same safety mechanisms.

Various modifications are possible within the meaning and range of equivalence of the appended claims.

We claim:

1. An airbag system, comprising a housing for a gas generator, said housing defining a chamber for the gas generator and having a peripheral wall, and said housing being provided with at least one opening; means for mounting an airbag opposite a section of said wall, said section being provided with at least one vent aperture; and a closure for said one opening, said closure being friction welded to said housing and forming a substantially gastight seal therewith.

2. The system of claim 1, further comprising at least one arm outward of and fast with said wall, said one arm at least in part defining a mounting element constituting part of said mounting means.

3. The system of claim 2, further comprising another arm outward of and fast with said wall, said other arm at least in part defining a mounting element constituting part of said mounting means.

4. The system of claim 1, wherein said housing comprises a tubular element.

5. The system of claim 4, wherein said housing element is substantially cylindrical.

6. The system of claim 1, wherein said housing has another opening; and further comprising another closure for said other opening, said other closure being friction welded to said housing and forming a substantially gastight seal therewith, and each of said closures having a substantially annular first portion receivable in a respective first section of said chamber, said first sections having respective first cross-sectional areas, and said first portions having respective second cross-sectional areas greater than the corresponding first cross-sectional areas, each of said closures further having an end designed to face outward of said chamber, and a second portion receivable in said chamber and located on a side of the respective first portion remote from the respective end, said second portions narrowing in a direction away from the respective first portions.

7. The system of claim 1, wherein said housing has another opening; and further comprising another closure for said other opening.

8. The system of claim 1, wherein said closure is provided with activating means for the gas generator.

9. The system of claim 8, wherein said housing has another opening; and further comprising another closure for said other opening, said other closure being free of activating means for the gas generator.

10. The system of claim 1, wherein said closure has at least one portion receivable in said chamber, said chamber having a first cross-sectional area and said one portion having a greater second cross-sectional area.

11. The system of claim 10, wherein said closure has an end designed to face outward of said chamber, and a second portion receivable in said chamber and located on a side of said one portion remote from said end, said second portion narrowing in a direction away from said one portion.

12. The system of claim 10, wherein said one portion is substantially annular.

13. An airbag system, comprising a housing for a gas generator, said housing defining a chamber for the gas generator and having a peripheral wall, and said housing being provided with at least one opening; means for mounting an airbag opposite a section of said wall, said section being provided with at least one vent aperture; and a closure for said one opening, said closure being provided with a groove for at least partly confining a body of material joining said closure to said housing.

14. The system of claim 13, wherein said closure forms a substantially gastight seal with said housing.

15. The system of claim 14, wherein said closure is friction welded to said housing.

16. The system of claim 13, wherein said groove has an arcuate cross section.

17. The system of claim 16, wherein said cross section is substantially semicircular.

18. The system of claim 13, wherein said closure is provided with an abutment arranged to cooperate with said groove in at least partly confining the body of joining material.

19. An airbag system, comprising a housing for a gas generator, said housing defining a chamber for the gas generator and having a peripheral wall, and said housing being provided with at least one opening; means for mounting an airbag opposite a section of said wall, said section being provided with at least one vent aperture; and a closure for said one opening, said housing having a shoulder in said chamber, and said closure having an end arranged to bear against said shoulder.

* * * * *